United States Patent
Shidara

(10) Patent No.: US 6,922,381 B2
(45) Date of Patent: Jul. 26, 2005

(54) OPTICAL DISK APPARATUS

(75) Inventor: Kiyoshi Shidara, Kawagoe (JP)

(73) Assignee: TEAC Corporation, Musashino (JP)

( * ) Notice: Subject to any disclaimer, the term of this patent is extended or adjusted under 35 U.S.C. 154(b) by 385 days.

(21) Appl. No.: 10/302,259

(22) Filed: Nov. 21, 2002

(65) Prior Publication Data

US 2003/0103425 A1 Jun. 5, 2003

(30) Foreign Application Priority Data

Nov. 30, 2001 (JP) .................................. 2001-365796

(51) Int. Cl.[7] .............................................. G11B 7/00
(52) U.S. Cl. ............................. 369/44.32; 369/53.32; 369/47.18
(58) Field of Search ......................... 369/44.32, 44.26, 369/44.27, 44.28, 44.29, 53.32, 53.12, 53.15, 47.18

(56) References Cited

U.S. PATENT DOCUMENTS 4,769,706 A 9/1988 Kaizaki 6,510,112 B1 * 1/2003 Sakamoto et al. ....... 369/44.35

FOREIGN PATENT DOCUMENTS

| JP | 57-149311 | 3/1984 |
| JP | 63061562 | 3/1988 |
| JP | 3034610 | 2/1991 |
| JP | 8180425 | 7/1996 |

* cited by examiner

Primary Examiner—Nabil Hindi
(74) Attorney, Agent, or Firm—Christensen O'Connor Johnson Kindness PLLC

(57) ABSTRACT

An optical disk apparatus capable of suppressing displacement of a servo system from a track even when a track defect is caused on an optical disk and achieving appropriate data recording and reproduction. In the case where any track defect is detected on an optical disk, a pulse width modulation signal, rather than a tracking servo signal created based on a tracking error signal, is used as a servo signal to drive an optical pick-up. The pulse width modulation signal is modulated such that its DC level becomes identical to a DC level of a tracking servo signal obtained immediately before detection of the track defect.

16 Claims, 6 Drawing Sheets

| DEFECT SIGNAL | SW1 | SW2 |
|---|---|---|
| Low | ON | OFF |
| Hi | OFF | ON |

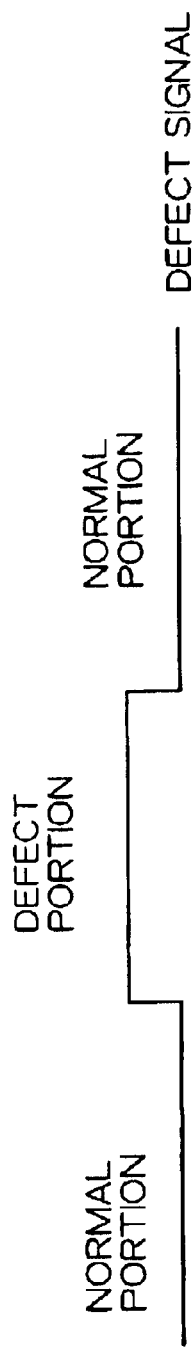
Fig. 7A
Fig. 7B

OPTICAL DISK APPARATUS

BACKGROUND OF THE INVENTION

1. Field of the Invention

The present invention relates to an optical disk apparatus, and in particular to suppression of skipping due to optical disk defects.

2. Description of the Related Art

Optical disk apparatuses for driving optical disks including CD, DVD, and the like, perform data recording and reproduction while maintaining focused and on-track conditions using focus and tracking servos, respectively. Specifically, a laser beam is irradiated toward the surface of an optical disk, and returned light from the surface is received. Then, the obtained reproduction RF signal is utilized to create focus and tracking error signals. These error signals are in turn utilized in creation of servo signals for driving the actuator to further drive the objective lens of a pick-up to move in the focusing and track width directions.

For CDs, an area where a laser beam remains within a track, namely, a dynamic range of a tracking error signal which is usable as a tracking servo system, is smaller than a half of a track pitch. Therefore, assuming a track pitch of approximately 1.6 $\mu$m, a dynamic range of smaller than 0.8 $\mu$m results. Because of the small dynamic range of a tracking error signal, chips or dust, if any, on a track may be enough to make it impossible for the servo system to precisely follow the track, causing the servo system to be displaced from the track.

In view of the above, technology has been proposed for separating a tracking servo system upon detection of any track defect on an optical disk and sending a signal, instead of a servo signal, which is sampled and held by a sample and hold circuit to a driving system before detection of the defect.

According to Japanese Patent Publication No. Hei 2-34091, for example, a detection circuit for detecting chips, dust, and so forth, on a disk is provided, and a DC level of a tracking error signal is sampled upon detection of chips, dust, and so forth. The DC level is held while the detection is continued until the chips, dust, and so forth are no longer detected, at which point normal control using a tracking servo is resumed.

However, with this arrangement in which a tracking servo system is separated upon detection of a defect and a DC level signal which is sampled immediately before the detection and held by a sample and hold circuit is supplied as a servo signal to a driving system, low resolution of hardware becomes problematic. Specifically, in a low speed operation at a standard or double speed, for example, in which control such as using the least significant one or two bits of a DA converter is applied due to a small driving voltage, low resolution of hardware (a low sampling bit rate) would make it difficult to sample a precise DC level. That is, in such a case, sampling a DC level may serve to impart a kick signal in a predetermined direction to the tracking servo system. In other words, sampling a DC level may serve as disturbance.

In particular, for optical disk apparatuses capable of high speed recording and reproduction, which is generally set with a large actuator coil voltage in order to accommodate a high speed operation, coverage of a possible driving voltage range by a limited number of bits of a DA converter, such as 256 bits, for example, may result in assignment of a relatively large range of voltage to one step. As a result, a small driving voltage used in a low speed operation cannot be properly dealt with and the position of an objective lens thus cannot be precisely held. This causes the servo system to be displaced from the track when it passes a defect.

FIG. 7 shows an example servo signal for an optical disk apparatus. FIG. 7A shows a detection signal supplied from a defect detection circuit, which remains low for absence of defect and high for presence of defect. Such a signal can be detected, as described in Japanese Patent Publication No. Hei 2-34091, based on the level of an amplitude of a reproduction RF signal.

FIG. 7B shows a signal waveform obtained in an operation in which a tracking servo signal is created to be output based on a tracking error signal for a normal portion and a servo signal which is sampled immediately before detection of a defect is output instead of a servo signal for a defect portion. A digital hold signal is converted into an analogue signal in a DA converter and then supplied to a driver. With low resolution of the DA converter, a signal of a greater than predetermined value is output even with respect to the least significant bit. That is, when a DC level for the normal portion is small, a DC level which is different from that of a normal portion is output, largely driving the objective lens in a predetermined position and thereby causing the objective lens to be displaced from the track.

Low resolution of hardware can be relatively enhanced by reducing an output dynamic range. However, simple reduction of an output dynamic range in turn induces deterioration of servo performance.

SUMMARY OF THE INVENTION

The present invention has been conceived to overcome the above problems and aims to provide an optical disk apparatus capable of suppressing displacement of a servo system from a track even when a track defect is caused on an optical disk and achieving appropriate data recording and reproduction.

In order to achieve the above object, according to the present invention, there is provided an optical disk apparatus, comprising means for irradiating a laser beam to an optical disk; means for receiving a returned beam from the optical disk to output an RF signal; means for creating a tracking error signal from the RF signal; means for creating a tracking servo signal based on the tracking error signal to be output; means for detecting a track defect on the optical disk; means for outputting a pulse width modulation signal as a servo signal in the place of the tracking servo signal upon detection of the track defect on the optical disk; and means for performing tracking control in response to the servo signal.

In an embodiment of the present invention, a DC level of the pulse width modulation signal is modulated so as to become identical to that of a tracking servo signal obtained immediately before detection of a track defect on the optical disk.

In another embodiment of the present invention, a DC level signal of a tracking servo signal obtained immediately before detection of a track defect is determined, and a sine wave signal with a DC level of zero or with a duty ratio of 50% is added to the DC level signal to thereby create the pulse width modulation signal.

When no track defect is detected, a tracking servo signal is used for tracking control. When any track defect is detected, on the other hand, a pulse width modulation signal is used for tracking control. This arrangement enables suppression of displacement of the servo system from the track due to insufficient resolution of an AD converter and/or a DA converter. Alternatively, when no track defect is detected, a combination signal of a tracking servo signal and a pulse width modulation signal maybe used for tracking control.

The present invention advantageously has a wider application, covering CD-ROM drives, CD-R/CD-RW drives, DVD-ROM drives, DVD-R/RW drives, and so forth.

BRIEF DESCRIPTION OF THE DRAWINGS

FIG. 7A is a diagram showing a defect signal according to related art; and

FIG. 7B is a timing chart of a servo signal (a drive signal) corresponding to FIG. 7A.

DESCRIPTION OF THE PREFERRED EMBODIMENTS

In the following, embodiments of the present invention will be described based on the accompanied drawings.

Figure 1:
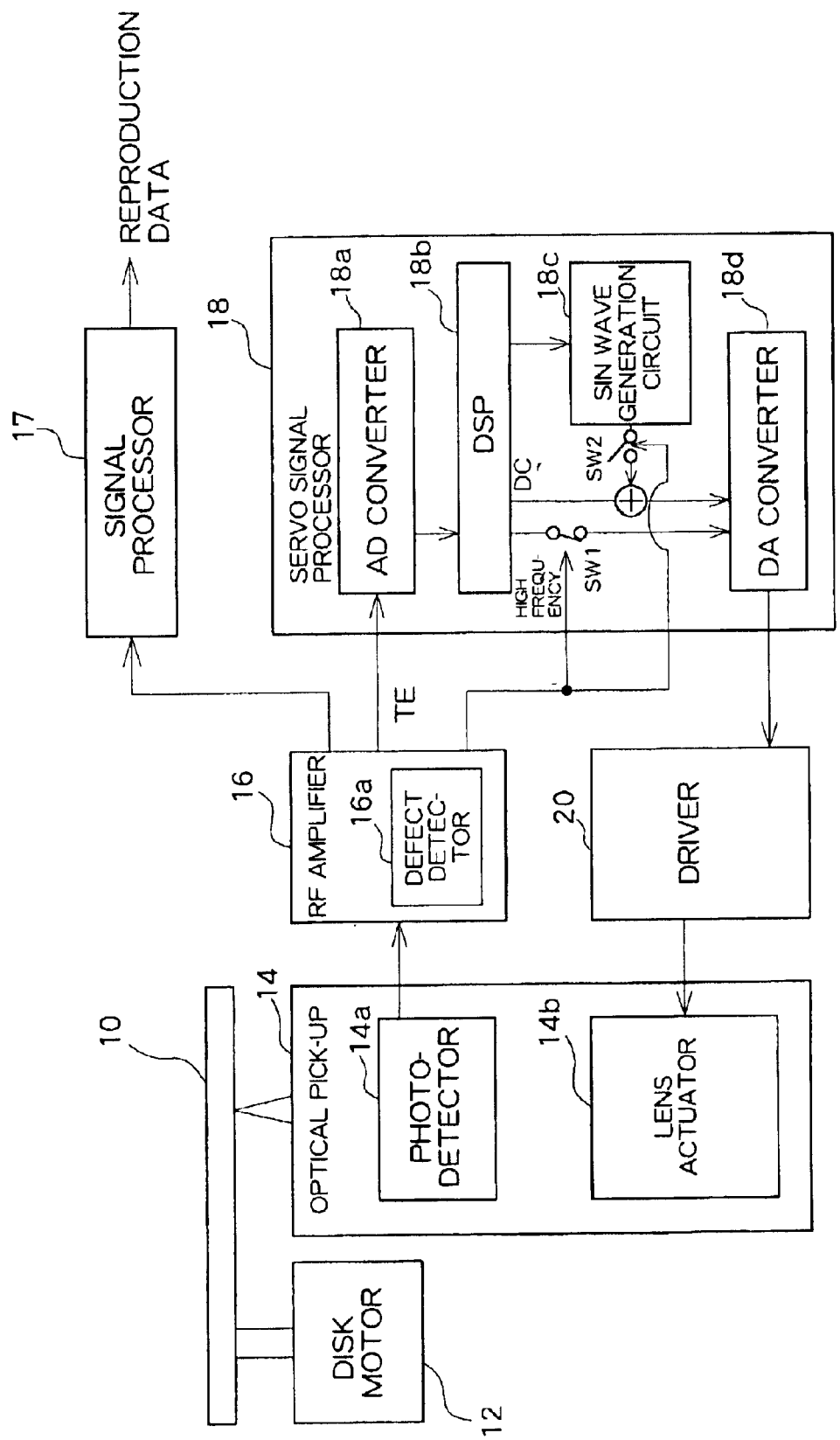
FIG. 1 is a block diagram showing a structure of an optical disk apparatus according to the present invention.

FIG. 1 is a block diagram showing a structure of an optical disk apparatus according to one embodiment of the present invention.

An optical disk 10 including CD, DVD, or the like, is driven to rotate by a disk motor 12. An optical pick-up 14, which is arranged opposed to the optical disk 10, irradiates a laser beam from a laser diode, or LD, to the optical disk 10 for data recording or reproduction. The optical pick-up 14 includes a photodetector 14a and an actuator 14b. The photodetector 14a receives a laser beam returned from the optical disk 10 and converts the received, returned beam into an electrical signal to output to an RF amplifier 16. The photodetector 14a can comprise four-segment photodetectors which are segmented in the circumferential and radial directions of the optical disk 10. The lens actuator 14b drives an objective lens in the focusing and track-width directions in response to a drive signal from a driver 20. The lens actuator 14b may specifically comprise a focal coil and a tracking coil both mounted on a movable side which includes an objective lens, and drives the object lens in the focusing and track-width directions independently through electromagnetic interaction with a magnetic circuit mounted on a fixed side.

An RF amplifier 16 comprises an amplifier, an equalizer, a waveform generator, a focus error detector, a tracking error detector, and a defect detector 16a. The RF amplifier 16 outputs a reproduction RF signal, created in the equalizer and the waveform generator, to a signal processor 17, and also a focus error signal FE, not shown, detected in the focus error detector, and a tracking error signal TE, detected in the tracking error detector, both to a servo signal processor 18. Note that a focus error signal, though not shown, is applied similarly to a tracking error signal, as shown. The RF amplifier 16 further supplies, via the defect detector 16a, a detection signal to the servo signal processor 18.

Creation of a reproduction RF signal, a focus error signal FE, and a tracking error signal TE is briefly described, though known, with reference to an example of four-segment photodetectors.

A signal from the four-segment photodetectors 14a, namely, A, B, C, and D, are all summed up into a signal (A+B+C+D) and then subjected to wave-formation to thereby create a reproduction RF signal. A difference between signals from the respective pairs of diagonal photodetectors in the four-segment photodetectors 14a, namely, (A+C)−(B+D), is utilized to create a focus error signal FE. A difference between signals from the respective pairs of photodetectors bisected in the circumferential direction in the four-segment photodetectors 14a, namely, (A+B)−(C+D), is utilized to create a tracking error signal TE.

The signal processor 17 comprises a binary section, a PLL section, a decoder section, an error correction section, and so forth, and demodulates a reproduction RF signal to output reproduction data to a system controller, not shown. The system controller in turn outputs the reproduction data to a superior device such as a computer via an interface. For data recording, recording data received from a computer is modulated in a modulator and then recorded onto an optical disk 10 using an LD of the optical pick-up 14 being driven.

The servo signal processor 18 creates a tracking servo signal based on a tracking error signal TE from the RF amplifier 16 to output to the driver 20. The servo signal processor 18 also creates a focus servo based on a focus error signal FE, although this creation is not described in this embodiment. The servo signal processor 18 comprises an AD converter 18a, a DSP (digital signal processor) 18b, a sine wave generation circuit 18c, a DA converter 18d, and switches SW1, SW2.

The AD converter 18a converts a tracking error signal TE from the RF amplifier 16 into a digital signal to output to the DSP 18b. From the supplied digital signal, the DSP 18b generates a digital signal with phase corrected. The DSP 18b also generates a DC level signal of a phase corrected signal to output to an adder. A DC level signal of a phase corrected signal can be extracted through a low pass filter having a predetermined cut-off frequency, for example. Alternatively, a DC level signal of a tracking error signal may be extracted instead.

The sine wave generation circuit 18c outputs a sine wave (SIN wave) with a duty ratio of 50%, the signal being referred to, in this embodiment, as a PWM signal because its DC level is set at a desired value through a function similar to pulse width modulation (PWM). A phase corrected signal from the DSP 18b is supplied to the switch SW1, while a PWM signal from the sine wave generation circuit 18c is supplied to the switch SW2. Through switching between the switches SW1, SW2, either a high area phase corrected signal and a DC level signal or a signal obtained by adding a PWM signal to a DC level signal is supplied to the DA converter 18d.

The DA converter 18d converts a received signal using predetermined resolution into an analogue signal to supply to the driver 20. The DA converter 18d may have conventional resolution of 256 bits, for example. A signal to supply to the DA converter 18d is determined depending on the switching between the switches SW1, SW2, which are turned on or off in response to a detection signal from the defect detector 16a in the RF amplifier 16. Specifically, the switch SW1 is turned on for absence of any track defect, and switch SW2 is turned on for presence of any track defect.

Figure 2:
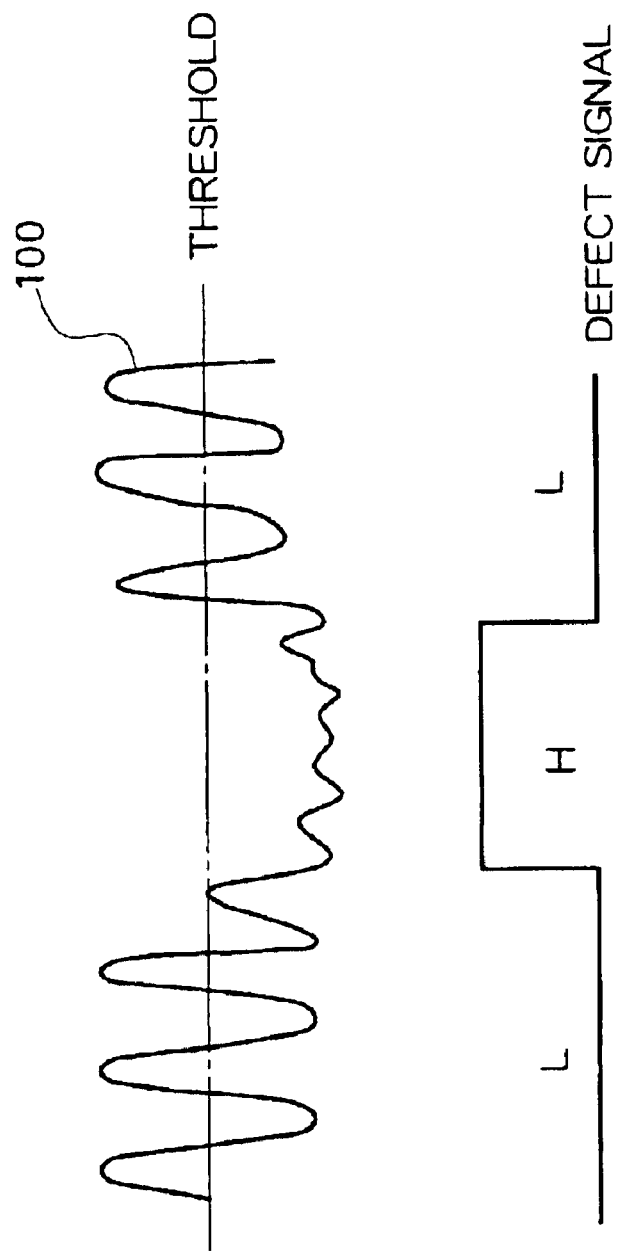
FIG. 2A is a diagram showing variation of an RF signal relative to a defect detection threshold.
FIG. 2B is a diagram showing a defect signal corresponding to FIG. 2A.

FIGS. 2A and 2B show a detection signal from the defect detector 16a in the RF amplifier 16. The defect detector 16a compares an amplitude level of an RF signal (A+B+B+D) and a predetermined threshold, and determines absence of a track defect on an optical disk 10 for the amplitude level equal to or larger than the threshold and presence of a track defect for the amplitude level smaller than the threshold. The defect detector 16a outputs a low signal for the level equal to or larger than the threshold and a high signal for the level smaller than the threshold.

FIG. 2A shows relative variation of a reproduction RF signal 100 relative to a threshold. FIG. 2B shows a corresponding detection signal. A low signal (defect signal) from the defect detector 16a indicates the optical disk 10 having no defect, while a high signal indicates the optical disk 10 having a defect. Such a defect signal is supplied to the switches SW1, SW2. Alternatively, a defect signal may be supplied to a system controller so that the system controller serves to turn on/off the switches SW1, SW2 according to the received defect signal. Further alternatively, a defect signal may be supplied to either one of the switches SW1, SW2 alone when these switches SW1, SW2 are turned on/off so as to compensate each other.

Figures 3, 4:
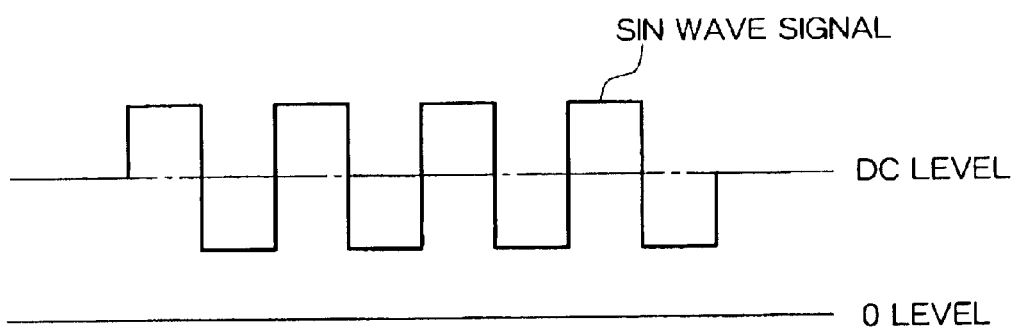
FIG. 3 is a diagram showing correlation between states of a defect signal and of switches SW1, SW2.
FIG. 4 is a diagram showing a waveform of a PWM signal.

In operation, FIG. 3 shows correlation between the status of a defect signal and that of the switches SW1, SW2 in this embodiment. For a low defect signal, or no track defect, the switch SW1 is turned on and the switch SW2 is turned off. In this case, a DC level signal and a high area servo signal based on a tracking error signal are supplied from the DSP 18b to the DA converter 18d. The DA converter 18d converts the received servo signal into an analogue signal to output to the driver 20. Briefly, a servo signal is created based on a tracking error signal and supplied to the driver 20 to drive the optical lens in a track width direction.

For a high defect signal, or presence of any track defect, on the other hand, the switch SW1 is turned off and the switch SW2 is turned on. In this case, a combined signal of a PWM signal from the sine wave generation circuit 18c and the DC level signal is supplied to the DA converter 18d, instead of a high area servo signal from the DSP 18b, which is then not supplied due to the switch SW1 remaining off. The objective lens is driven in response to the supplied PWM signal. In other words, when any defect is detected, high area components of a servo signal are cut off and a sine wave signal is added to the DC level signal to be output to drive the object lens.

FIG. 4 shows a waveform of a PWM signal output from the sine wave generation circuit 18c. In the drawing, a one dot broken line represents a DC level extracted through the low pass filter of the DSP 18b, that is, a DC level of a servo signal obtained immediately before defect detection with the optical disk 10. The solid line in the drawing represents a sine pulse signal with a duty ratio 50%. The pulse signal is added to the DC level signal. As the negative and positive amplitudes of the pulse signal are equal, a duty ratio of 50% can make the DC level of the pulse signal be zero. In other words, the DC level of a PWM signal from the SIN wave generation circuit 18c becomes equal to that of a servo signal obtained immediately before detection of a track defect on an optical disk. Supply of such a signal from the driver 20 to the lens actuator 14b as a servo signal enables holding of the objective lens at a position substantially corresponding to a DC level of the PWM signal. In this manner, an appropriate hold position for the objective lens can be obtained irrespective of the resolution of the DA converter 18.

Figure 5:
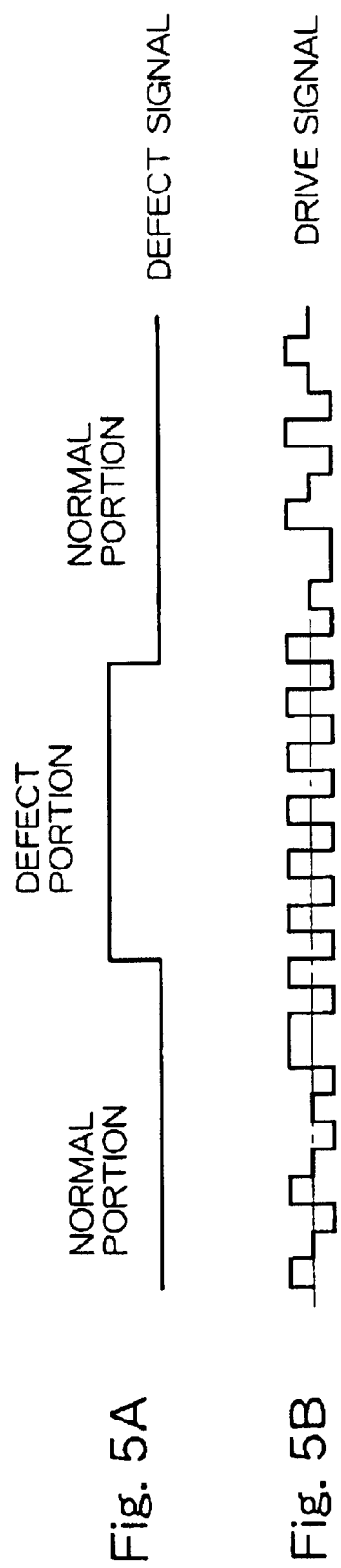
FIG. 5A is a diagram showing a defect signal.
FIG. 5B is a timing chart of a servo signal (a drive signal) corresponding to FIG. 5A.

FIGS. 5A and 5B show a waveform of a servo signal in this embodiment. Specifically, FIG. 5A shows a waveform of a defect signal from the defect detector 16a, while FIG. 5B shows that of a servo signal. Comparison between the waveforms of the servo signals of FIG. 5B and FIG. 7B makes it clear that a servo signal in this embodiment allows the objective lens to be held at a position corresponding to a desired value even in a low speed operation with a small coil driving voltage being set. This is because, in this embodiment, a DC level for a defect portion is reduced through PWM control to a level smaller than a voltage level which is defined by the range of one step of the DA converter. Note that the DC level before detection of track defect and that of a PWM signal are identical in FIG. 5B.

As described above, in this embodiment, when any track defect is detected, a PWM signal having a DC level which is substantially equal to that of a servo signal obtained immediately before the detection of a track defect is created as a servo signal, so that an objective lens of an optical pick-up can be held at a position corresponding to a value immediately before the defect detection. This can prevent the objective lens from being displaced beyond a dynamic range, in other words, displaced from a track, when control using a tracking serve system is resumed in response to a low defect signal.

Figure 6:
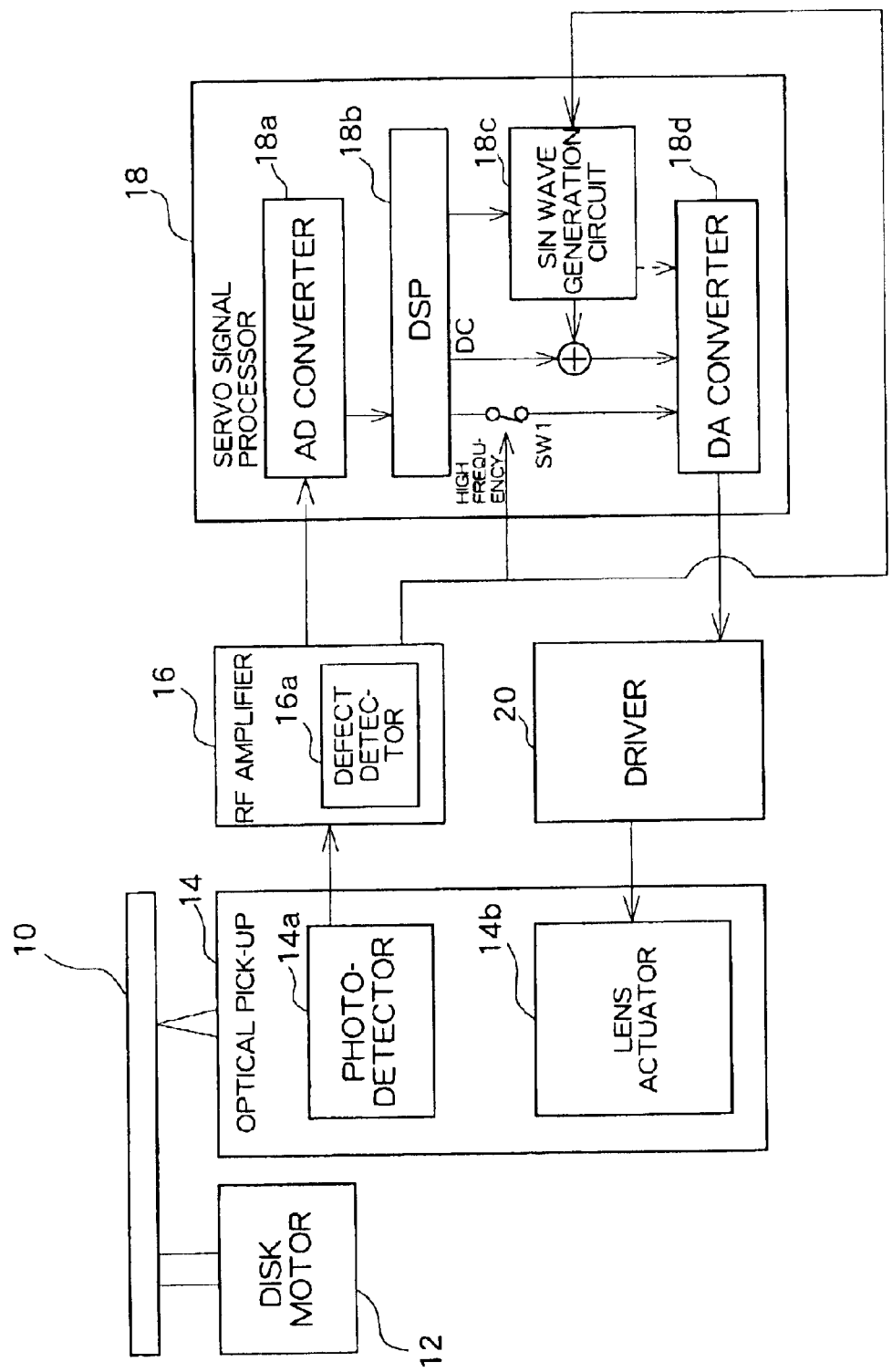
FIG. 6 is a block diagram showing another structure of an optical disk apparatus according to the present invention.

FIG. 6 is a block diagram showing another structure of an optical disk apparatus according to the present invention, which is basically identical to that of FIG. 1 except that the servo signal processor 18 does not incorporate a switch SW2 and, therefore, a PWM signal from the sine wave generation circuit 18c is always added to a DC level signal from the DSP 18b and supplied to the DA converter 18d.

In this structure, for a low defect signal, or absence of any track defect, the switch SW1 is turned on, so that a high area servo signal based on a tracking error signal from the DSP 18b and a PWM signal from the sine wave generation circuit 18c are both supplied to the DA converter 18d. The DA converter 18d converts the received signal into an analogue signal to supply to the driver 20. The driver 20 supplies an original servo signal accompanied by a PWM signal to a lens actuator 14b to drive the objective lens. A tracking error signal obtained in this arrangement includes a PWM component. When such a tracking error signal is supplied to the servo signal processor 18, the DSP 18b creates a servo signal which compensates for a displacement due to the PWM component, and supplies the resultant servo signal to the driver 20 to drive the objective lens. Displacement due to the PWM component is absorbed in the servo system, causing no effect.

For a high defect signal, or presence of any track defect, on the other hand, the switch SW1 is turned off and, as described above, a PWM signal from the sine wave generation circuit 18c is added to a DC level signal and supplied to the DA converter 18d and further to the driver 20. This arrangement allows the objective lens to be held at a position where the objective lens is located immediately before the detection of a track defect, preventing the objective lens from being displaced from the track as it passes the defect.

This structure has the advantage that it is simpler as it includes only one switch SW1.

Embodiments of the present invention are described above, although the present invention is not limited with various other modifications being possible.

For example, differing from the above in which a DC level of a servo signal immediately before detection of a track defect is determined in the DSP 18b and a sine pulse signal having a duty ratio of 50% is added to the DC level signal, any PWM signal, not only a sine wave signal, may be applicable and the duty ratio of such a PWM signal before being outputting from the sine wave generation signal 18c may be adjusted such that the signal has a DC level identical to that which is determined in the DSP 18b. In this case, an adder is unnecessary because the DA converter 18d converts a PWM signal from the SIN wave generation circuit 18c into an analogue signal, with the flow represented by the broken like in FIG. 6.

The important thing is to realize, through a pulse width modulation, a DC level which is smaller than a range covered by one step of hardware, for driving the driver 20.

For another example, differing from the above in which the DC level of a PWM signal is made identical to that of a servo signal before detection of a track defect, a DC level of a PWM signal may be corrected according to the shape of the track. Specifically, the DC level of a PWM signal may be corrected according to the pitch of a spirally formed track.

Alternatively, the DC level of a PWM signal may be maintained at a predetermined level within a predetermined period of time with a defect signal remaining high, and corrected according to the spiral shape of the track after the lapse of the predetermined period of time. Specifically, as shown in FIG. 6, a defect signal from the defect detector 16a may additionally be supplied to the sine wave generation circuit 18c to determine an amount of time with a defect signal remaining high. For the determined amount of time being equal to or less than a predetermine time T con, a sine wave with a duty ratio of 50% is output, as described above. For the determined amount of time exceeding a predetermined time T com, the duty ratio may be sequentially changed, beginning with 50%, according to the spiral shape of the track.

Still alternatively, whether or not to correct a DC level may be determined depending on the position of a concerned track defect in the radial direction of the optical disk 10.

What is claimed is:

1. An optical disk apparatus, comprising:
    means for irradiating a laser beam to an optical disk;
    means for receiving a returned beam from the optical disk to output an RF signal;
    means for creating a tracking error signal from the RF signal;
    means for creating a tracking servo signal based on the tracking error signal to output;
    means for detecting a track defect on the optical disk;
    means for outputting a pulse width modulation signal as a servo signal in the place of the tracking servo signal upon detection of the track defect on the optical disk; and
    means for performing tracking control in response to the servo signal.

2. The optical disk apparatus according to claim 1, wherein the pulse width modulation signal is modulated so as to have a DC level identical to a DC level of a tracking servo signal obtained immediately before detection of the track defect on the optical disk.

3. The optical disk apparatus according to claim 1, further comprising:
    means for detecting a DC level of a tracking servo signal obtained immediately before detection of the track defect; and
    means for adding a sine wave signal to a signal of the DC level to thereby create the pulse width modulation signal.

4. The optical disk apparatus according to claim 1, further comprising:
    switching means for switching between output of the tracking servo signal and the pulse width modulation signal,
    wherein
    the switching means outputs the tracking servo signal when no track defect is detected and the pulse width modulation signal when any track defect is detected.

5. The optical disk apparatus according to claim 1, further comprising:
    switching means for switching between output of the tracking servo signal and the pulse width modulation signal,
    wherein
    the switching means outputs the tracking servo signal and the pulse width modulation signal when no track defect is detected and the pulse width modulation signal when any track defect is detected.

6. The optical disk apparatus according to claim 2, wherein the pulse width modulation signal is modulated so as to have a DC level identical to a DC level of a tracking servo signal obtained immediately before the detection of the track effect within a predetermined period of time with the detection continued, and a DC level of the pulse width modulation signal is modulated according to a spiral shape of the track after a period of time with the detection continued exceeds the predetermined period of time.

7. The optical disk apparatus according to claim 2, wherein the pulse width modulation signal has a duty ratio of 50%.

8. The optical disk apparatus according to claim 1, wherein the means for crating a tracking servo signal includes
    AD conversion means for converting the tracking error signal into a digital signal,
    means for creating a phase corrected signal for the digital signal of the tracking error signal, and
    DA conversion means for converting the phase corrected signal into an analogue signal,
    wherein
    the pulse width modulation signal is modulated so as to have a DC level which is smaller than a level of a range assigned for one quantization step of the AD conversion means or the DA conversion means.

9. An optical disk apparatus, comprising:
    an optical pick-up;
    an RF amplifier for creating a tracking error signal based on an RF signal supplied from the optical pick-up;
    a detector for detecting a track defect on the optical disk based on the RF signal supplied from the optical pick-up;
    an AD converter for converting the tracking error signal into a digital signal;
    a digital signal processing circuit for creating a phase corrected signal of the digital signal to output as a tracking servo signal;
    a level detector for detecting a DC level of the tracking servo signal;
    an adder for adding a pulse width modulation signal to a signal of the DC level to output;
    an AD converter for converting a pulse width modulation signal from the adder into an analogue servo signal to output when the detector detects a track defect; and
    a driver for driving the optical pick-up in a track width direction based on the analogue servo signal supplied from the DA converter.

10. The optical disk apparatus according to claim 9, wherein the DA converter converts the tracking servo signal supplied from the digital signal processing circuit into an analogue servo signal to output when the detector detects no track defect.

11. The optical disk apparatus according to claim 9, wherein the DA converter converts a combination signal of the tracking servo signal supplied from the digital signal processing circuit and a signal from the adder into an analogue servo signal to output when the detector detects no track defect.

12. The optical disk apparatus according to claim 9, wherein the pulse width modulation signal is a sine wave signal having a DC level zero.

13. The optical disk apparatus according to claim 9, wherein the pulse width modulation signal is a sine wave signal having a duty ratio of 50%.

14. An optical disk apparatus, comprising:

an optical pick-up;

an RF amplifier for creating a tracking error signal based on an RF signal supplied from the optical pick-up;

a detector for detecting a track defect on the optical disk based on the RF signal supplied from the optical pick-up;

a servo signal processing circuit for outputting a phase corrected signal of the tracking error signal as a servo signal when the detector detects no track defect and, when the detector detects a track defect, a pulse width modulation signal having a DC level identical to a DC level of the servo signal obtained immediately before detection of the track defect as a servo signal; and a driver for driving the optical pick-up in a track width direction based on a servo signal from the servo signal processing circuit.

15. The optical disk apparatus according to claim 14, wherein the pulse width modulation signal is an addition signal of a sine wave signal having a duty ratio of 50% and a DC level signal having a DC level immediately before detection of the track defect.

16. The optical disk apparatus according to claim 14, wherein the pulse width modulation signal is a sine wave signal which is modulated so as to have a duty ratio which enables a DC level identical to a DC level immediately before the detection of the track defect.

* * * * *

UNITED STATES PATENT AND TRADEMARK OFFICE
CERTIFICATE OF CORRECTION

PATENT NO.   : 6,922,381 B2
DATED        : July 26, 2005
INVENTOR(S)  : K. Shidara It is certified that error appears in the above-identified patent and that said Letters Patent is hereby corrected as shown below:

Column 8,
Line 7, "track effect" should read -- track defect --.
Line 15, "crating" should read -- creating --.
Line 16, "includes" should read -- includes: --.

Signed and Sealed this

Thirteenth Day of December, 2005

JON W. DUDAS
*Director of the United States Patent and Trademark Office*